(12) United States Patent
Kraxner et al.

(10) Patent No.: US 10,668,485 B2
(45) Date of Patent: Jun. 2, 2020

(54) SEPARATION DEVICE FOR SEPARATING PARTICLES FROM A FLUID FLOW

(71) Applicant: MCI MANAGEMENT CENTER INNSBRUCK—INTERNATIONALE HOCHSCHULE GMBH, Innsbruck (AT)

(72) Inventors: Michael Kraxner, Landeck (AT); Tobias Kofler, Gries/Brenner (AT)

(73) Assignee: MCI MANAGEMENT CENTER INNSBRUCK-INTERNATIONALE HOCHSCHULE GMBH, Innsbruck (AT)

(*) Notice: Subject to any disclaimer, the term of this patent is extended or adjusted under 35 U.S.C. 154(b) by 248 days.

(21) Appl. No.: 15/745,197

(22) PCT Filed: Jul. 18, 2016

(86) PCT No.: PCT/EP2016/067065
§ 371 (c)(1),
(2) Date: Jan. 16, 2018

(87) PCT Pub. No.: WO2017/013070
PCT Pub. Date: Jan. 26, 2017

(65) Prior Publication Data
US 2019/0009281 A1    Jan. 10, 2019

(30) Foreign Application Priority Data
Jul. 17, 2015   (EP) ..................... 15177401

(51) Int. Cl.
*B01D 45/16* (2006.01)
*B01D 35/16* (2006.01)
(Continued)

(52) U.S. Cl.
CPC ............... *B04C 3/04* (2013.01); *B01D 35/16* (2013.01); *B01D 45/16* (2013.01);
(Continued)

(58) Field of Classification Search
CPC ........ B01D 45/12; B01D 45/16; B01D 41/00; B01D 35/16
(Continued)

(56) References Cited

U.S. PATENT DOCUMENTS 4,265,640 A * 5/1981 Bielefeldt .............. B01D 45/12
55/391
6,572,668 B1 * 6/2003 An ........................ A47L 9/1658
55/428

FOREIGN PATENT DOCUMENTS

DE    661744 C    7/1938
DE    2945951 A1    5/1981
(Continued)

*Primary Examiner* — Robert A Hopkins
(74) *Attorney, Agent, or Firm* — Workman Nydegger

(57) ABSTRACT

A separation device (1) for separating particles from a fluid flow, comprising a centrifugal separator (2), wherein the centrifugal separator (2) comprises a separation chamber (3), a fluid inlet (5), at least two dip tubes (7, 7') and at least one particle discharge opening (9, 9') and the separation chamber (3) is substantially formed as a rotational body. The rotational body has a casing (13) and two end faces (15, 15'), the fluid inlet (5) opening into the separation chamber (3) tangentially to the surface of the casing (13) and one dip tube (7) being situated in one of the end faces (15) and the other dip tube (7') being situated in the other end face (15').

20 Claims, 11 Drawing Sheets

(51) Int. Cl.
    *B04C 3/04*     (2006.01)
    *B04C 5/081*     (2006.01)
    *B04C 5/14*     (2006.01)
    *B04C 5/04*     (2006.01)
    *B04C 1/00*     (2006.01)
    *B04C 5/13*     (2006.01)
    *B01D 46/24*     (2006.01)
    *B01D 46/00*     (2006.01)
    *B01D 50/00*     (2006.01)
    *B04C 3/06*     (2006.01)
    *B04C 9/00*     (2006.01)
    *B04C 3/00*     (2006.01)

(52) U.S. Cl.
    CPC ..... *B01D 46/0065* (2013.01); *B01D 46/0068* (2013.01); *B01D 46/24* (2013.01); *B01D 46/2411* (2013.01); *B01D 50/002* (2013.01); *B04C 1/00* (2013.01); *B04C 3/06* (2013.01); *B04C 5/04* (2013.01); *B04C 5/081* (2013.01); *B04C 5/13* (2013.01); *B04C 5/14* (2013.01); *B04C 9/00* (2013.01); *B04C 2003/003* (2013.01); *B04C 2009/004* (2013.01)

(58) Field of Classification Search
    USPC ............... 55/302, 429, 432, 459.1, 301, 304
    See application file for complete search history.

(56) References Cited

FOREIGN PATENT DOCUMENTS

| | | |
|---|---|---|
| DE | 3615747 A1 | 11/1987 |
| DE | 202011002037 U1 | 6/2011 |

\* cited by examiner

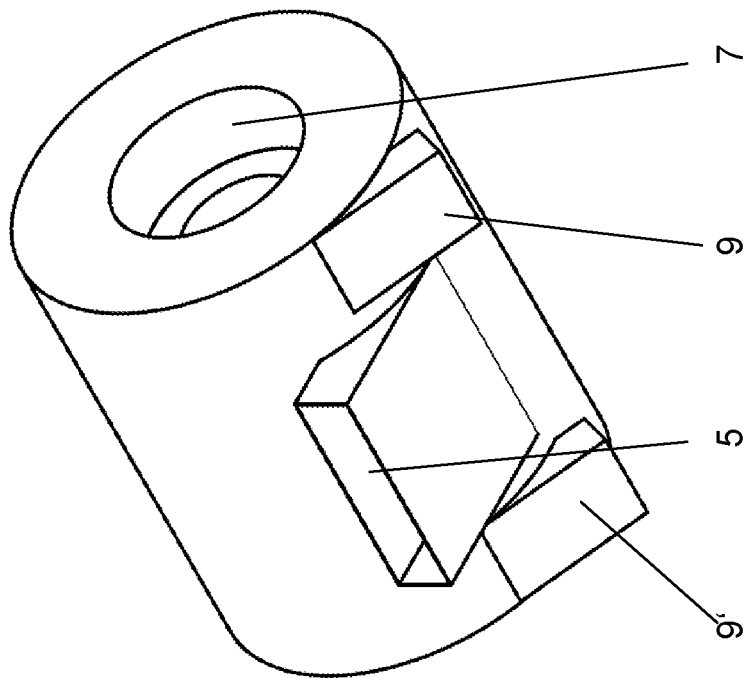
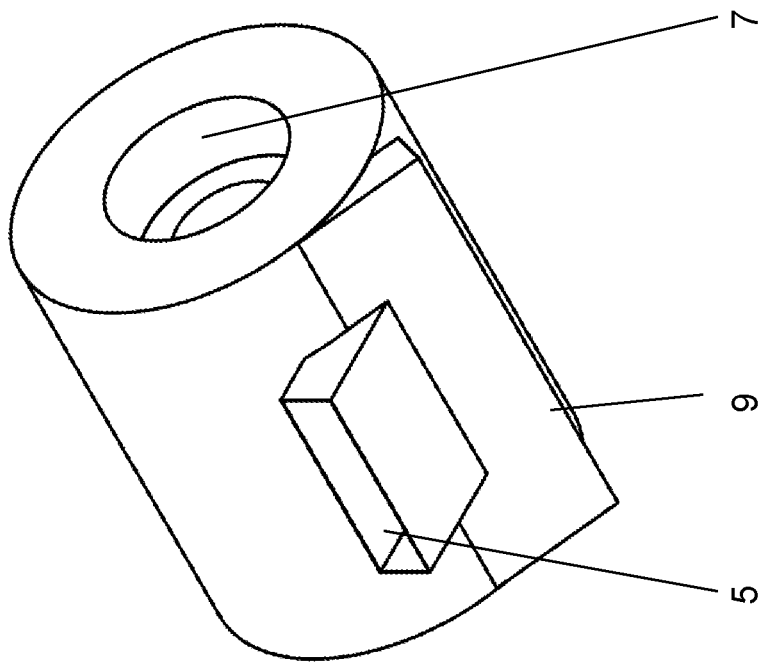

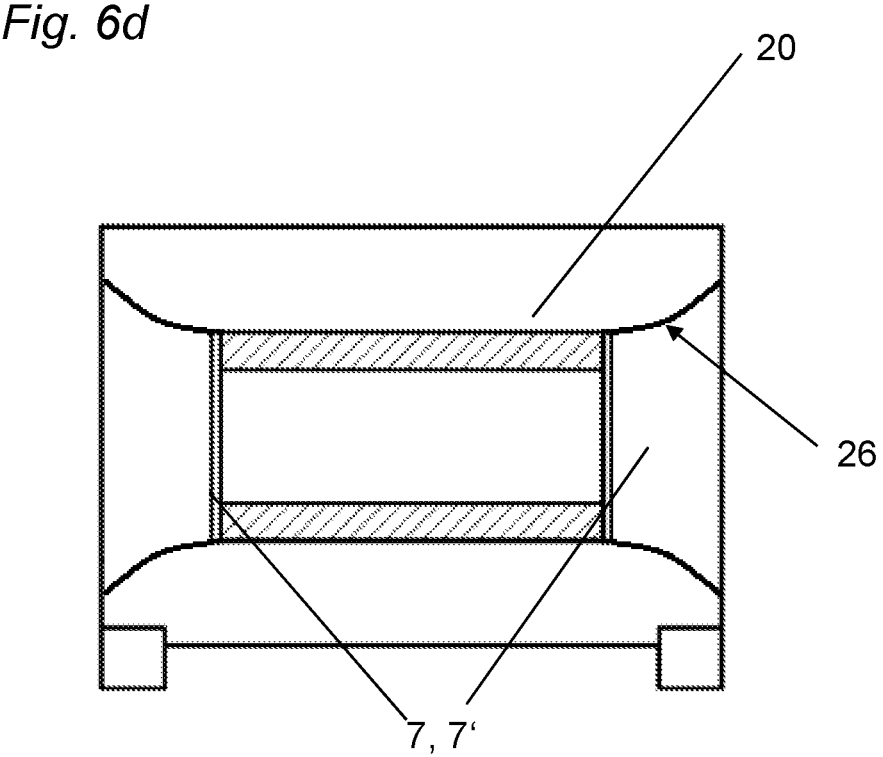

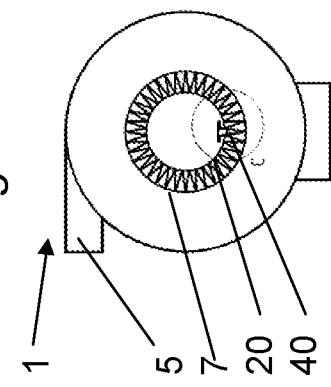
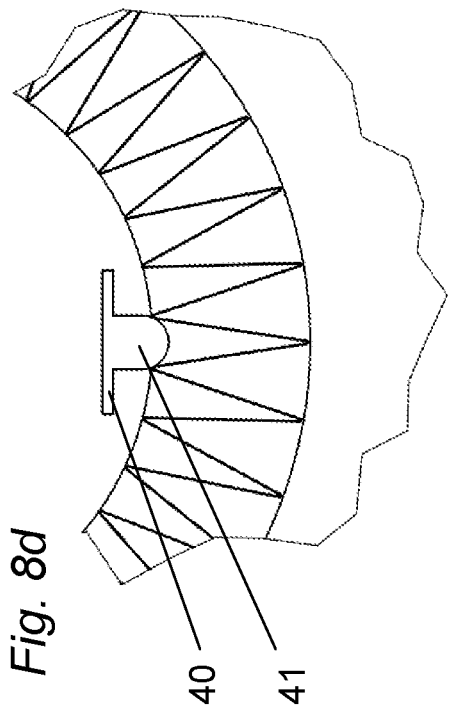
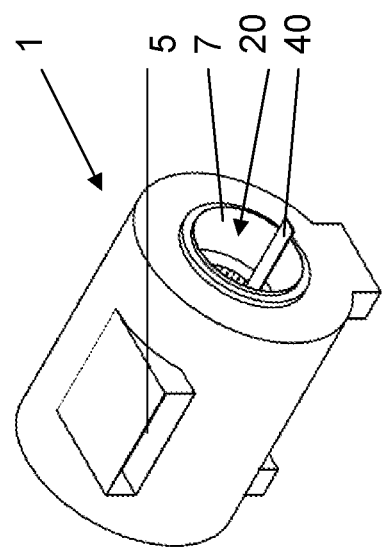
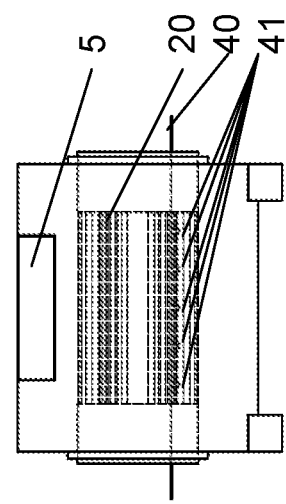

SEPARATION DEVICE FOR SEPARATING PARTICLES FROM A FLUID FLOW

The invention relates to a separation device for particles from a fluid flow, comprising a centrifugal separator, wherein the centrifugal separator comprises a separation chamber, a fluid inlet, at least one particle discharge opening and at least two dip tubes.

PRIOR ART

Separation devices for particles (by which particles or droplets are understood in the following) from a fluid flow find application, for example, in processes for the separation of dispersed solids in fluid flows. In doing so, so-called combination filter elements are very often used, in which various separators are combined. Frequently, a centrifugal separator is used as a pre-separator and combined with a filter element consisting of porous media. The task of the pre-separation is to separate particles from the disperse fluid flow as effectively as possible in order to reduce the burden on the downstream filter element. The combination causes an almost complete separation of the particles, whereby the larger portion including the coarse portion of the particles is separated by the centrifugal separator.

Due to the continuous particle discharge, there is no increasing pressure loss over the centrifugal separator throughout the filtration period. On the contrary, in filter elements with porous media, an adhesion of particles in and on the porous medium itself or on the surface of the filter elements, respectively, occurs with a growing filter cake, accompanied by an increasing pressure loss as far as to a complete collapse of the filter element throughout the filtration period. The combination of those principles of separation generally results in an increased filtration time and thus a separation process which is more effective and more sustainable for the process.

The efficiency of the pre-separation by a centrifugal separator is crucial for the time period until the filter element in the combination filter is covered with filter cake. Conventional centrifugal separators (cyclone separators) with a single dip tube require not only a relatively large construction volume, but also a post-separation due to the limited separation particle size. To address those drawbacks, centrifugal separators have been designed in which one dip tube is located at the upper end of the separation chamber and another one at the lower end. Since the particle discharge opening is also arranged at the lowermost end of the separation chamber, the second dip tube must be mounted above said particle discharge opening with a bend in the separation chamber. This, in turn, has the disadvantage that the circulation of the fluid in the separation chamber is disturbed in the area of the lower dip tube, resulting in inhomogeneous flows which will put mechanical strain on the centrifugal separator and subsequently will have an adverse effect on the separation.

BRIEF DESCRIPTION OF THE INVENTION

It is therefore an object of the present invention to remedy this situation and to provide a separation device for particles from a fluid flow comprising a centrifugal separator, which does not suffer from those drawbacks. In addition, the separation device should have a compact design. In particular, the time until a downstream filter element is covered optionally also with a filter cake should also be as long as possible.

This object is achieved by a separation device for particles from a fluid flow, comprising a centrifugal separator, wherein the centrifugal separator comprises
- a separation chamber,
- a fluid inlet,
- at least one particle outlet and
- at least two dip tubes, which is characterized in that the separation chamber is substantially formed as a rotational body, wherein the rotational body has a casing and two end faces between which said separation chamber is arranged, wherein the fluid inlet leads into the separation chamber tangentially to the surface of the casing and wherein one dip tube each is situated in each one of the end faces.

In the present invention, the centrifugal separator has a separation chamber, a tangential fluid inlet and two—preferably mirror-symmetrically arranged—dip tubes as fluid outlet from the centrifugal separator. The separated particles are collected in at least one collection container via the particle outlet. A compact design, a more uniform flow pattern and, in further consequence, a small flow resistance are advantages compared to the prior art.

The rotational body comprises the separation chamber. Preferably, the rotational body is a right circular cylinder. Alternatively, however, it may also be configured as a mirror-symmetrical frustum.

Furthermore, a horizontal orientation of the separation chamber is possible with the described construction, that is, the rotational body, preferably the cylinder, can exhibit an axis of rotation parallel to the horizontal, whereby also the dip tubes are arranged horizontally. In conventional centrifugal separators, the separating chamber is oriented vertically. Because of the horizontal orientation, the same fluid speeds are created on both dip tubes. Also, the particle discharge openings can be installed at the bottom side of the separation chamber.

The dip tubes project into the separation chamber and each have one opening in the interior of the separation chamber so that the pre-purified fluid can penetrate into the dip tube. Moreover, the dip tubes—at least in the area of the end face of the cylinder—likewise each have one opening toward the outside so that the purified fluid will be able to exit the separation device.

The dip tubes may constitute simple circular, straight cylinders. However, with regard to the flow control, it has turned out to be advantageous if the dip tubes are configured conically toward the outside.

In a preferred embodiment variant, the dip tubes are arranged along the axis of rotation of the rotational body (preferably of the circular cylinder). This facilitates the connection of the dip tubes to a filter element.

An alternative embodiment variant provides that the dip tubes are arranged eccentrically to the axis of rotation of the rotational body (preferably of the circular cylinder). Especially in the inlet region and at the discharge, this may give rise to optimized flow conditions, resulting in an optimized separation.

Namely, in a preferred embodiment variant, it is envisaged that the dip tubes are connectable or connected via a filter element in the separation chamber. Such a design has several advantages. Usually, another filter element is arranged downstream of the centrifugal separator. For this purpose, in case of two dip tubes, a piping or a sheath for the centrifugal separator must be provided in order to guide the fluid, which has been pre-purified in the centrifugal separator, toward the filter element.

If the filter element is now clamped between the dip tubes in such a way that the fluid must flow through the filter element in order to get into the pure fluid flow via the dip tubes, such a piping or sheath can be omitted. In addition, this leads to an even more compact design, since the filter element is integrated into the rotational body or the separation chamber, respectively.

The filter element is preferably a folded filter, since such filters have a large filter surface. However, the filter can also have any other design, likewise, various materials are suitable as media—depending on the desired field of application.

In the simplest case, the filter element is a cartridge filter, which is open on both front sides. Such an element can easily be attached onto the dip tubes and clamped therebetween.

In order that the filter element can be attached easily, it is advantageous if the dip tubes have a circular cross-section.

In one embodiment of the invention, it may be envisaged that the particle discharge opening extends along the entire casing, preferably tangentially, but possibly also radially to the generated surface of the rotational body.

In an alternative embodiment, several particle discharge openings are provided, preferably arranged symmetrically along the generated surface of the rotational body. Preferably, two particle discharge openings are provided. Particularly preferably, they are arranged radially to the generated surface. Such a configuration has the advantage that a tear-off edge emerges on the side facing the flow, which abruptly lowers the local flow velocity and thus considerably improves the particle discharge. The fluid inlet is then preferably arranged at the top side, and the particle discharge openings are arranged at the bottom side of the centrifugal separator. As a result, the separated material can be discharged at the particle discharge openings by the effect of gravity. In this case, the fluid inlet is arranged particularly preferably centrally on the top side, and the particle discharge openings are arranged laterally offset from the fluid inlet at the bottom side.

In contrast to tangentially arranged particle discharge openings, particle discharge openings with an exclusively radial discharge have the advantage that an additional sheath of the separation chamber is no longer required.

The at least one particle discharge opening is arranged at the bottom side of the rotational body or the separation chamber, respectively.

With the separation device according to the invention, the separation of different particles is possible. If the particles are solid, the fluid flow can be liquid or gaseous. By way of example, the use of the separation device in cutting devices such as saws, involving the emergence of dust or chips, may be mentioned. In this case, the fluid flow is the dust- and chip-containing exhaust air, which must be filtered.

If the particles are liquid, the fluid flow can be gaseous. For example, the separation of an undesired liquid from a gas as a fluid flow may be mentioned.

Furthermore, it is envisaged that the at least one particle discharge opening opens into a collection container connected to the separation chamber in a fluid-tight manner.

In one embodiment variant, it may be envisaged that the dip tubes open into a container which preferably surrounds the centrifugal separator completely. In this way, the purified fluid can be collected in the container and subjected to further treatment.

In one aspect of the invention, a device for removing the filter cake is provided on the filter element.

Such a device significantly increases the service life of the filter element. Different possibilities are conceivable as to how said device for removing the filter cake can be configured. For example, it may comprise an air compressor or a compressed air reservoir arranged after the dip tubes. Thus, it is possible to charge the dip tubes with the clamped filter element with compressed air, which, in further consequence, causes the filter cake to fall off, if the filter element is backflushed against the direction of filtration.

However, the device for removing the filter cake may also comprise one or more essentially stationary or movable projections, which are arranged in the separation chamber or, respectively, inside or outside of the dip tubes. If the dip tubes are now pivoted along the axis of rotation, the dip tubes can be rotated about the axis of rotation along with the filter element, thus guiding the filter element alongside the fixed projections, whereby the filter cake is scraped off or knocked off. The stationary projection may also include a brush.

Furthermore, in one aspect of the invention, a cleaning valve may be provided, which is preferably attached to the separation chamber. The cleaning valve may be integrated into the cylinder casing of the separation chamber, which is preferably essentially cylindrical. Preferably, the cleaning valve is articulated to the separation chamber. For example, the cleaning valve can be fixed such that, when it is tilted up, it projects partially into the interior of the separation chamber and partially toward the outside. For this purpose, a pivot mechanism can be provided, which is attached to the cleaning valve roughly centrally. The cleaning valve can be fixed and designed such that, in an upwardly tilted position, it may loosen by mechanical strain at the preferably rotatable filter element, thus regenerating the filter element.

DETAILED DESCRIPTION OF THE INVENTION

Based on the figures and the description of the figures, further details and advantages of the invention are explained.

FIGS. 1a, 1b schematically show perspective illustrations of a separation device for particles from a fluid flow according to an embodiment variant of the invention.

FIGS. 2a-2c schematically show perspective illustrations of separation devices according to three embodiment variants of the invention with different particle discharge openings.

FIGS. 5a, 5b shows two embodiment variants of separation devices with a crude fluid inlet arranged at the bottom.

FIGS. 6a-6d show views of the embodiment variant of FIG. 1.

FIGS. 8a-8d show views of a device for removing the filter cake from the filter element.

Figure 1A:
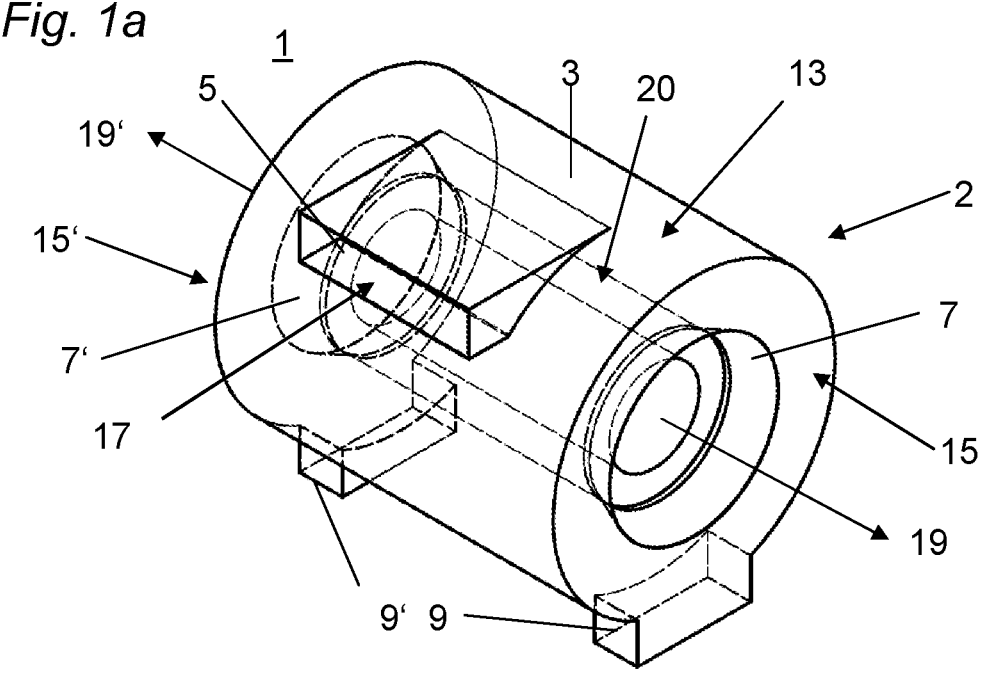

FIG. 1a shows a separation device 1 according to an embodiment variant of the invention. The separation device 1 comprises a centrifugal separator 2 with a separation chamber 3, a fluid inlet 5 and two particle discharge openings 9, 9'. Furthermore, two dip tubes 7, 7' are provided. The separation chamber 3 has the shape of a rotational body, namely that of a right circular cylinder, which has a casing 13 and two end faces 15, 15'. The fluid inlet 5 opens into the separation chamber 3 tangentially to the surface of the casing 13. The tangential opening is indicated by an arrow 17. One dip tube 7 is arranged in one end face 15, whereas the other dip tube 7' is arranged in the other end face 15'.

The disperse crude fluid loaded, for example, with solids flows through the fluid inlet 5 into the separation chamber 3 of the centrifugal separator 1. In the present case, the fluid inlet 5 has a rectangular shape, but, of course, can also be shaped in other forms such as, e.g., oval, square, polygonal etc. (see also FIGS. 4a to 4c). Due to the tangential inlet of the disperse material flow of the crude fluid (here: solids as particles and fluid) into the separation chamber 3, said flow is forced into a rotating flow path by the cylindrical shape. As a result of the circular motion, the particles and the fluid undergo a centrifugal acceleration. The density difference between solids and fluid and, respectively, different inertias lead to an accumulation of solids on the inner generated surface (separation wall) of the cylinder of the separation chamber 3.

Figure 1B:
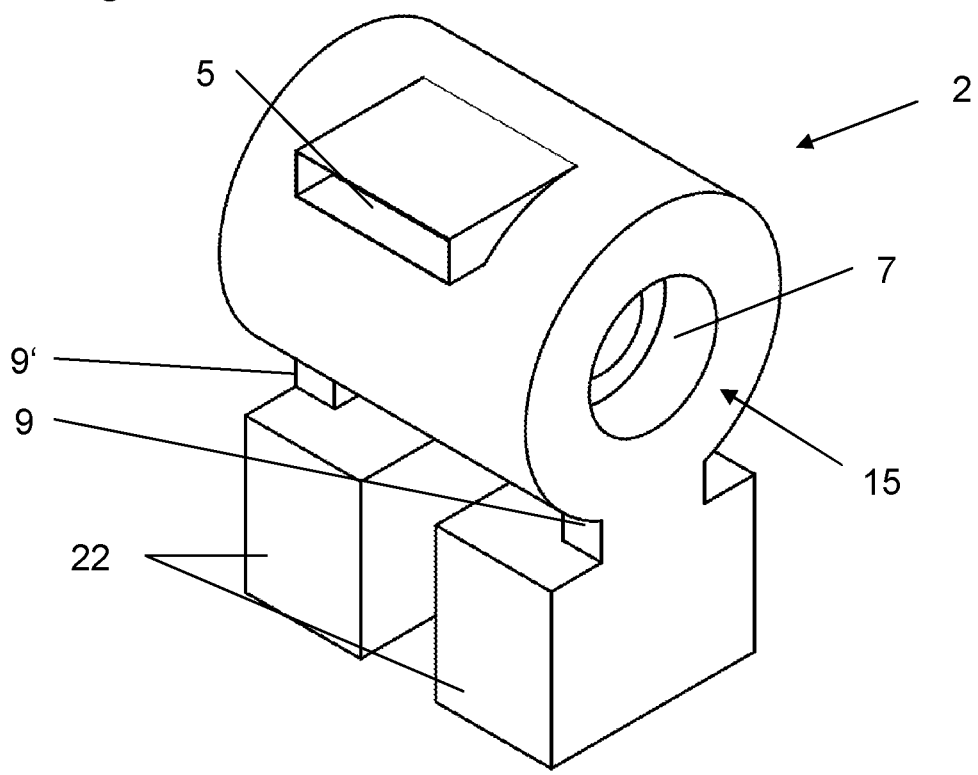

The solids at the separation wall are deposited through particle discharge openings 9,9' into collection containers 22 (FIG. 1b). The geometrical shape of the particle discharge openings 9,9' is adjusted depending on the type and behavior of the solid to be separated. The possibility illustrated herein shows a divided discharge with two particle discharge openings 9, 9' arranged radially at the front sides of the separation chamber 3. In addition to the embodiment variant comprising two particle discharge openings 9, 9', which is illustrated herein, embodiment variants with only one particle discharge opening 9 (for example, a slot-shaped particle discharge opening 9 extending across the entire length of the separation chamber 3) or several particle discharge openings 9, 9' for separating the solids are conceivable as well. In any case, the collection of the separated solids occurs in collection containers 22 which are isolated toward the outside in a pressure-tight and, respectively, fluid-tight manner. The purified fluid flows through the dip tubes 7, 7' from the centrifugal separator 1 toward the outside, as indicated by the arrows 19, 19'. In addition to the variant comprising two collection containers 22 as illustrated herein, of course only one or more than two collecting vessels 22 may also be provided.

The particle discharge openings 9, 9' may be configured as passage openings at the bottom side, which ensures a minor stall (see FIG. 1a).

Figure 2A:
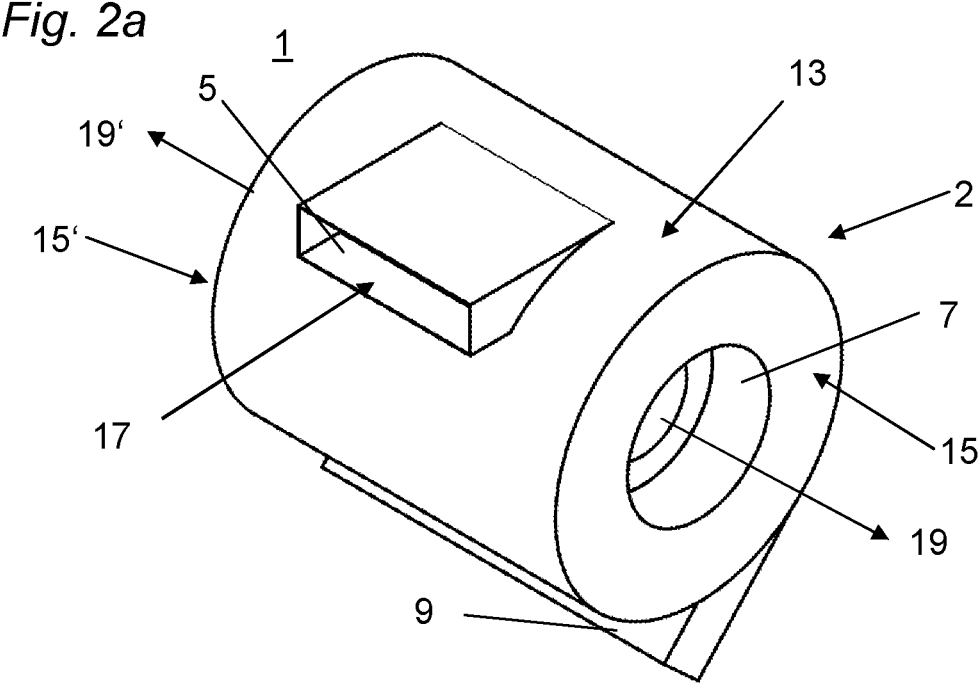
Figure 2B:
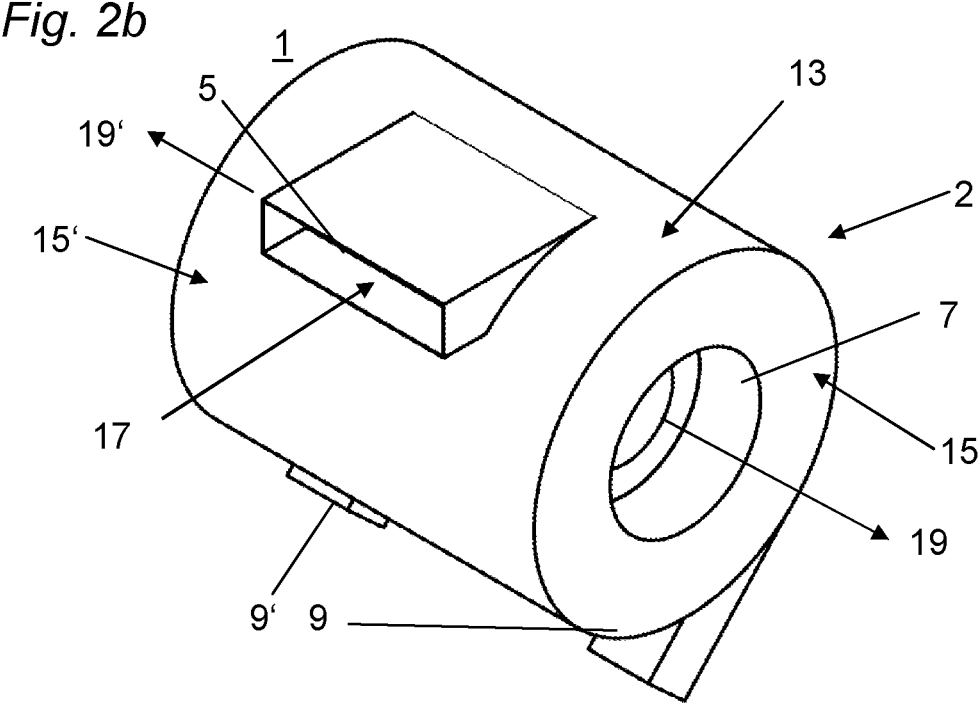
Figure 2C:
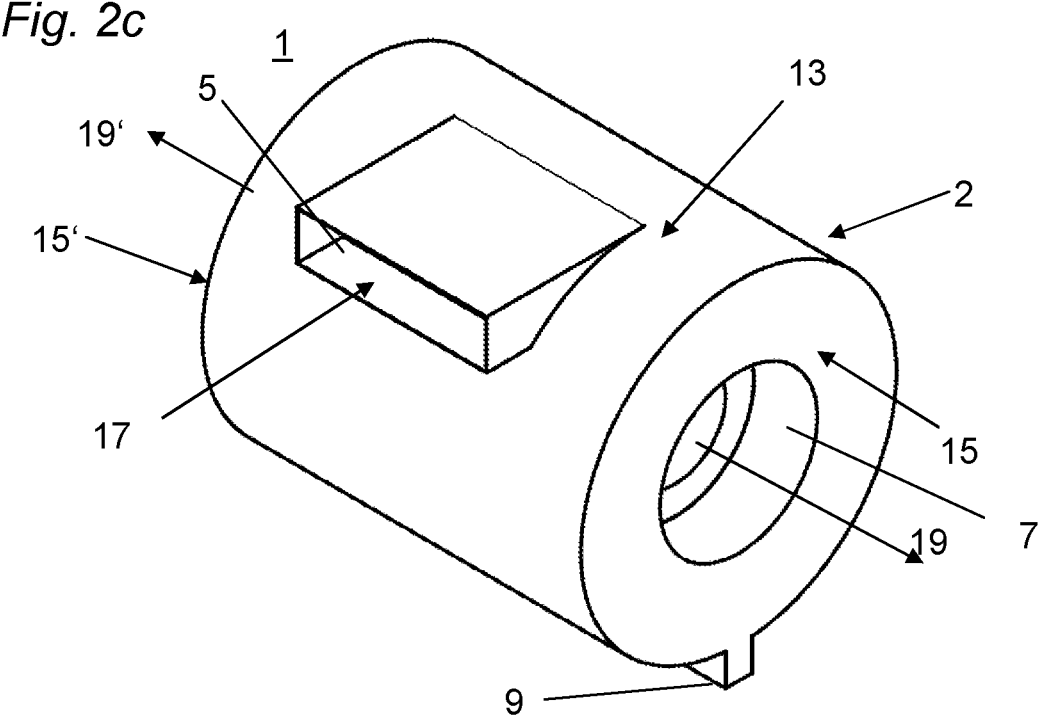

FIGS. 2a to 2c each show a separation device 1 comprising a centrifugal separator 2, which structurally corresponds to the separation device 1 of FIG. 1a so that a detailed description of the individual components is omitted at this point and reference can be made to the description of FIG. 1a. The essential difference between the separation devices 1 of FIG. 1a and FIG. 2a, 2b or 2c consists in the number and shape of the particle discharge openings 9, 9'. While FIG. 1a exhibits two particle discharge openings 9, 9' at the front sides of the separation chamber 3 with passage openings, FIG. 2a discloses a single tangential particle discharge opening 9 across the entire length of the separation chamber 3 in the form of a slot. FIG. 2b discloses two separate tangential particle discharge openings 9, 9'. FIG. 2c shows a particle discharge opening 9 in the form of a passage opening.

Figure 3:
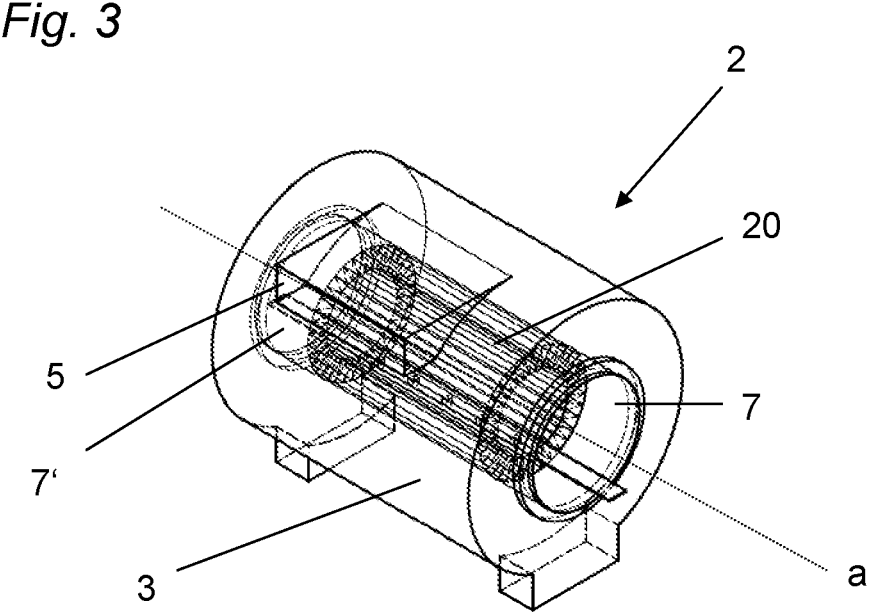
FIG. 3 shows a separation device with a filter element in the separation chamber.

To improve the cleaning performance of the centrifugal separator 1, a filter element 20 may furthermore be provided in one aspect of the invention. In the present case, the filter element 20 is clamped between the two dip tubes 7, 7'. The filter element 20 consists of a porous filter material with which the residual solid contents is separated from the fluid flow. The arrangement of this filter element 20 between the dip tubes 7, 7' within the separation chamber 3 is illustrated in FIG. 3. A pressure-tight connection between the filter element 20 and the dip tubes 7, 7' is provided. The geometrical shape of the dip tubes 7, 7' leads to the cylindrical configuration of the filter element 20 as a cartridge filter. As shown herein, it is advantageous if the filter element 20 runs centrally along the cylinder axis of the separation chamber 3 and if the filter element 20 itself has a substantially cylindrical shape.

FIG. 1b also shows collection containers 22 for collecting the particles. Of course, only a single collection container 22 may also be provided.

The fluid flow of lower density and therefore lower inertia flows inward and thus further through the porous filter medium of the filter element 20. Subsequently, the pure fluid stream thus purified completely leaves the separation device 1 through the dip tubes 7, 7' on both sides of the centrifugal separator 2 or, respectively, at the end faces of the separation chamber 3. The arrangement of the filter element 20 in the separation chamber 3 gives rise to a more favorable flow control within the separation chamber 3 as a result of the increased local circumferential speeds around the filter element 20. The circumferential speed correlates with the separation efficiency of the centrifugal separator 2. The individual main dimensions of the components contribute in different ways to the overall efficiency of the separation device 1. A decrease in pressure loss results from an increase in the dip tube diameter 7, 7'. This is effected, on the one hand, by the reduced flow velocity in the dip tube 7, 7' itself and, on the other hand, by the enlargement of the filter surface of the filter element 20 resulting therefrom. At the same time, an increase in the dip tube diameter 7, 7' results in a less efficient pre-separation of the centrifugal separator 2 and thus in an increased filter load on the filter element 20, which, in turn, causes the pressure loss of the filter element 20 to rise more rapidly.

Figure 4C:
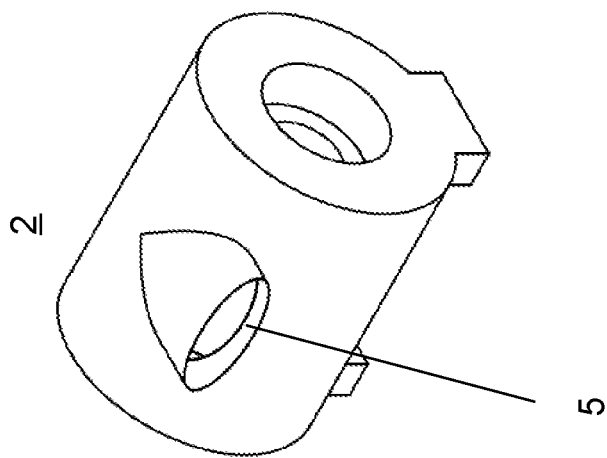
FIGS. 4a-4c show embodiment variants of separation devices according to the invention with different shapes for the fluid inlet opening.
Figure 4B:
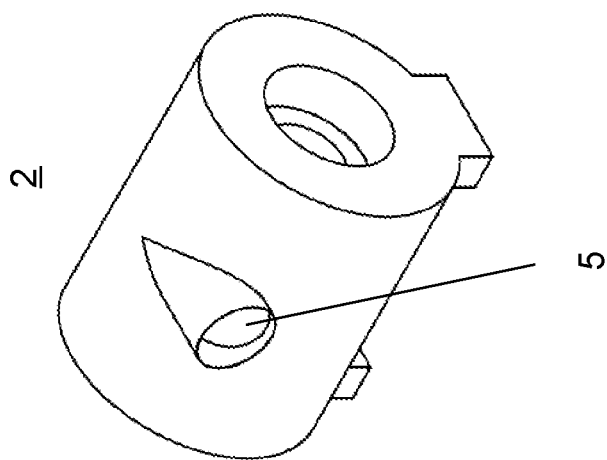
Figure 4A:
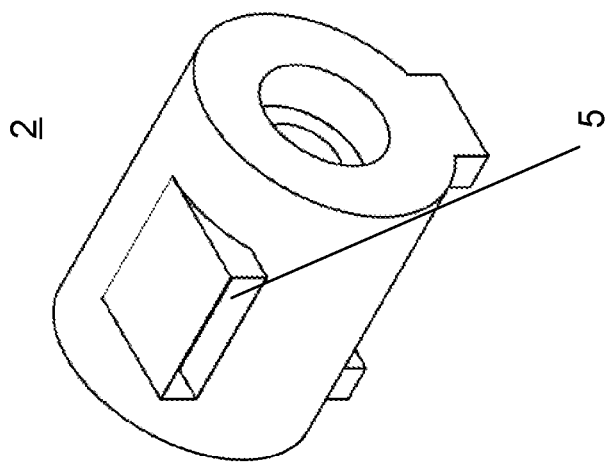

The degree of separation of the centrifugal separator 2 correlates with the inlet velocity, from which the centrifugal acceleration of the solid is derived. For influencing the flow profile at the inlet into the separation chamber 3, there is the possibility of geometrically changing the fluid inlet 5 (FIGS. 4a to 4c). Besides the simple modification of the geometrical dimensions of the fluid inlet 5, there is also the possibility of influencing the flow profile via its form. In this connection, possibilities arise of shaping the fluid inlet 5 in the form of a rectangle, as well as round or polygonal configurations (not shown). Basically, from a fluidic point of view, it turns out to be more reasonable to construct the fluid inlet 5 with a low height/width ratio. This leads to a more homogeneous flow profile in the separation chamber 3 and thus a better separation result.

FIG. 5a shows an embodiment variant of the invention according to FIG. 1 with the difference that the fluid inlet 5 opens into the centrifugal separator 2 at the bottom side of the separation chamber 3, whereas, in FIG. 1, the fluid inlet 5 opens into the centrifugal separator 2 at the top side of the separation chamber 3. The mouth of the fluid inlet 5 is in a direction opposite to the particle discharge opening 9.

FIG. 5b shows an embodiment variant of the invention according to FIG. 2 with the difference that the fluid inlet 5 opens into the centrifugal separator 2 at the bottom side of the separation chamber 3, whereas, in FIG. 2, the fluid inlet 5 opens into the centrifugal separator 2 at the top side of the separation chamber 3. The mouth of the fluid inlet 5 is in a direction opposite to the particle discharge openings 9, 9'.

Especially for requirements according to which very large particles are to be separated, the fluid inlet 5 into the centrifugal separator 2 may occur tangentially at the bottom side. In doing so, a pre-sedimentation of major solids contents occurs already in the area of the fluid inlet 5 due to the high sedimentation rate of the large particles. The sedimented solids contents are deposited immediately into the collection container 22 through the fluid inlet 5 arranged at the bottom side. The immediate separation results in a reduced likelihood that major solids contents will dynamically push against the filter element. As a result of the high velocity of the solids in the swirl of the separation chamber 3, a large selective pulse effect on the porous filter medium of the filter element 20 is created, whereby a mechanical destruction may be caused. To prevent this, a protective cage may be installed around the filter element 20, in addition to the arrangement of the fluid inlet 5.

Figure 6A:
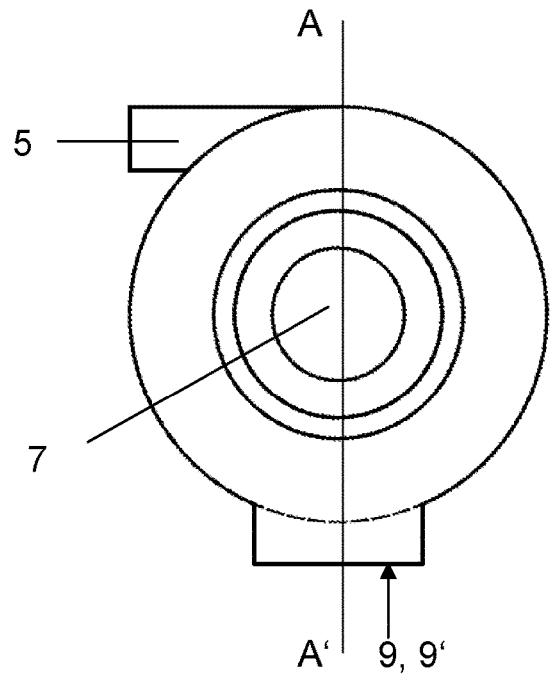
Figure 6B:
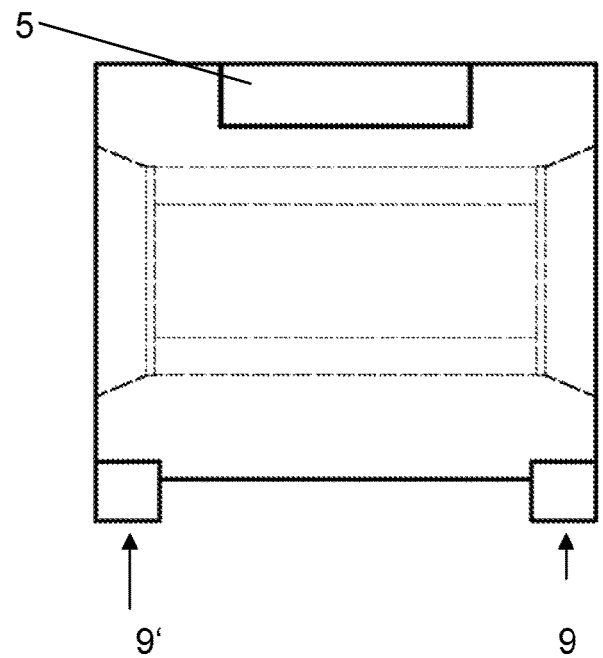
Figure 6C:
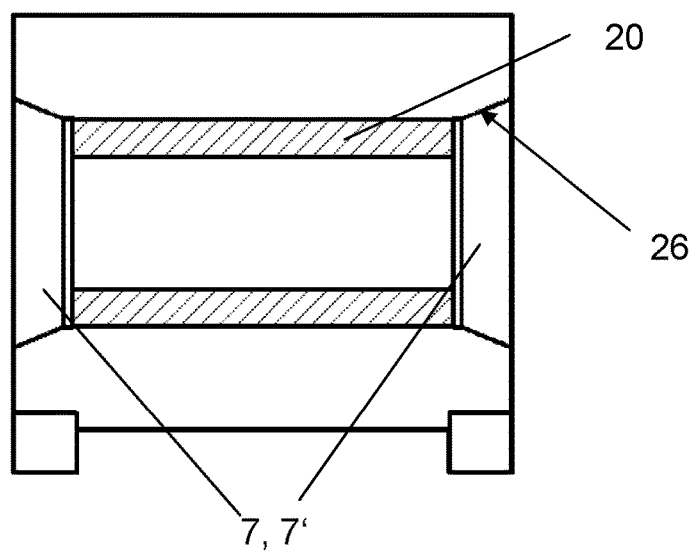
Figure 7A:
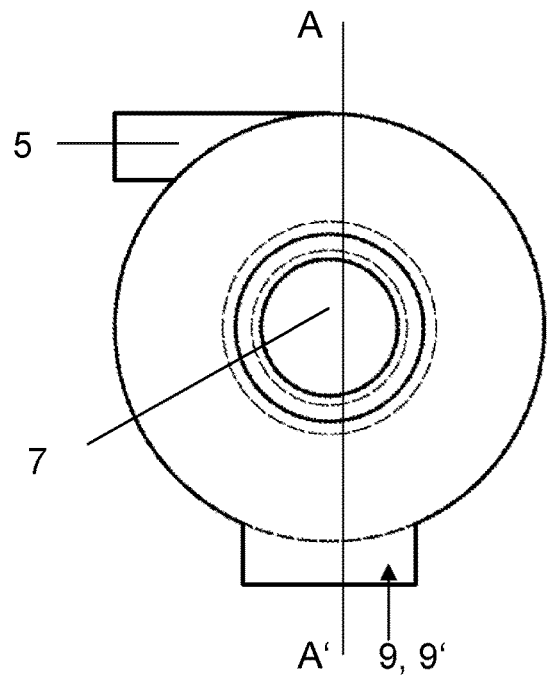
FIGS. 7a-7d show the views according to FIGS. 6a-6c of an alternative embodiment variant and also with non-cylindrical dip tubes.
Figure 7B:
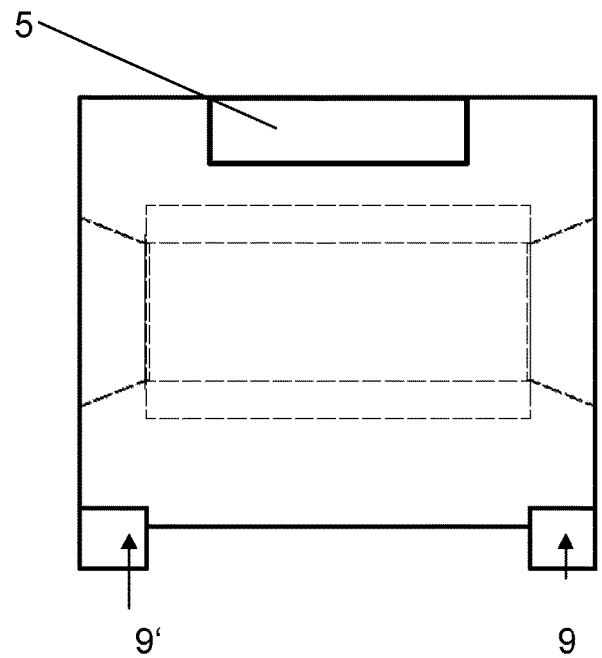
Figure 7C:
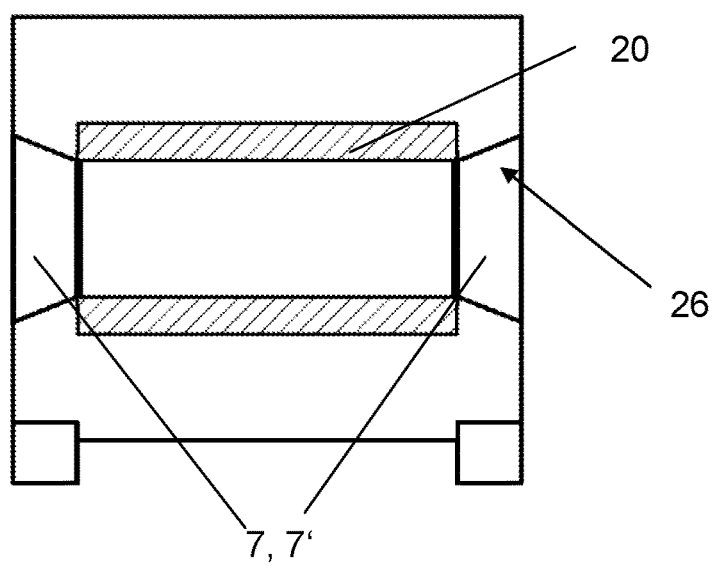
Figure 7D:
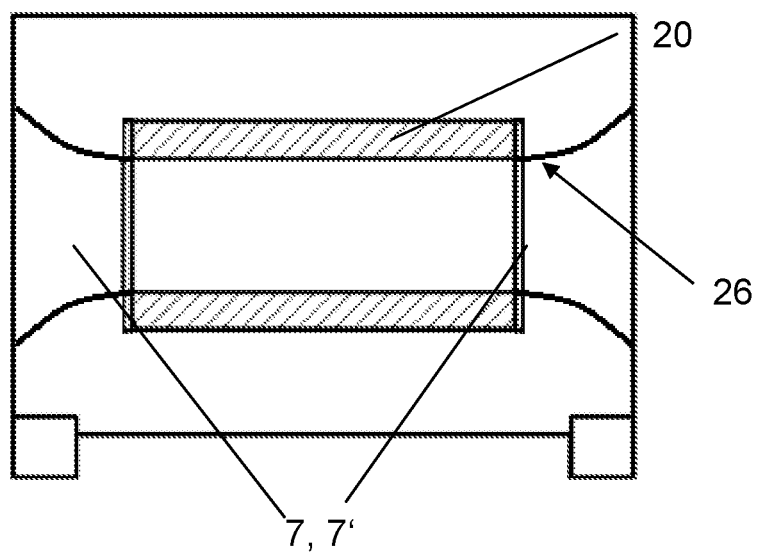

In FIGS. 6a to 6b, views of the embodiment variant according to FIG. 1 are illustrated. FIG. 6a shows a side view from which the shape of the separation chamber 3 as a circular, straight cylinder is even more evident. FIG. 6b shows a front view of the example of FIG. 1. FIGS. 6c and 6d show sections taken along line A-A' of FIG. 6a. In these cases, the dip tubes 7, 7' are recognizably illustrated as conical—(FIG. 6c) or trumpet-shaped (FIG. 6d). In this case, the filter element 20 is flush with the dip tubes 7, 7'. One way to optimize the pressure loss in the dip tubes 7, 7' can be seen in FIGS. 6a to 6b. Here, by increasing the flow cross-section, the speed of the pure fluid at the dip tube outlet is reduced, thereby decreasing the entire pressure loss. The expansion can be effected by various geometrical shapes and can be implemented in a fluidically optimized manner.

The sealing of the filter element 20 between the dip tubes 7, 7' may also occur at the inside of the filter element 20. This arrangement results in an increased circumferential speed in the inlet area of the separation chamber 3 by the modified cross-sectional area and hence in a better separation of the solids. The abrupt change in diameter at the inlet of the dip tube causes a reduction in the circumferential speed. In this area, a sedimentation of solids is of no relevance, however, since physical proximity to the discharge is provided and the solid has effectively been separated. In this connection, the closed design of the front faces of the filter element 20 toward the separation chamber 3 is important.

FIGS. 7a to 7d correspond to the illustrations of FIGS. 6a to 7d with the difference that the shape of the dip tubes 7, 7' exhibits a smaller cone. Moreover, the filter element 20 projects beyond the conical or trumpet-shaped portions of the dip tubes 7, 7'. This allows—in contrast to the example of FIGS. 6a to 6d—minor variations in the length of the filter element 20 to be balanced out. This is a filter assembly sealed on the inside.

In one aspect of the invention, a device for cleaning the filter element 20 is provided. The cleaning is supposed to clean the filter cake built up on the surface of the porous filter medium of the filter element 20, thus reducing the pressure loss by the filter element 20 and effecting filter regeneration. This may occur during the ongoing filter operation of the separator as an online regeneration and as an offline regeneration without filtration of a charged crude fluid flow. The separated filter cake is indeed an agglomerate of particles smaller than the cut-size diameter of the centrifugal separator 2, but has a large mass and attack surface in the agglomerate and can be separated by the dust discharge. One possibility is the opposite flow through the porous filter medium by means of a pressurized fluid. This may occur by a pressure surge from the pure fluid side, which causes the built-up filter cake to flake off and permits further filtration of the crude fluid flow.

A further possibility of filter regeneration provides mechanical strain on the filter surface of the filter element 20 and, respectively, the filter cake itself, which is illustrated, for example, in FIGS. 8a to 8d. Therein, FIG. 8a shows a perspective illustration, FIG. 8b is a view from the front side with the filter element 20 for illustration, FIG. 8c is a side view, and FIG. 8d is a magnification of the section of FIG. 8c marked by "C".

Herein, the porous filter medium of the filter element 20 is mechanically stressed by contacting cleaning knobs or brushes, and the built-up filter cake is detached. The arrangement of those cleaning brushes may occur within the filter medium 20, i.e., on the pure fluid side. In doing so, a rotatable design of the dip tubes 7, 7' incl. filter element 20 brings about an increased cleaning efficiency. By the rotatable design of the dip tubes 7, 7', associated with the rotation of the filter medium 20, the build-up filter cake is separated. The relative movement between the filter medium 20 and the cleaning brush, which is required therefor, is ensured by a fixed brush/knobs 41 in the interior of the filter medium 20, which are attached to a knob carrier 40. In the present example, a total of 5 knobs 41 are provided. Of course, cleaning may also be achieved if the dip tubes 7, 7' and possibly the filter medium 20 remain static and the cleaning knobs 41 move relative thereto. This may be achieved, for example, by moving the knob carrier 40.

Figure 9A:
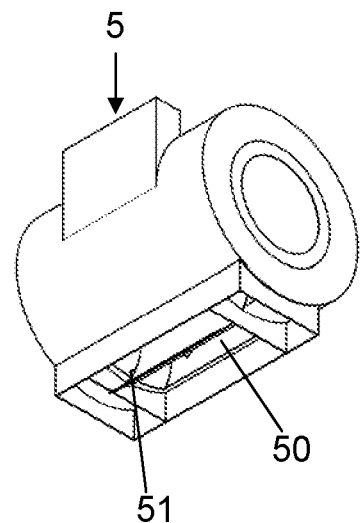
FIGS. 9a-9c show views of a separation device with a cleaning valve.
Figure 9B:
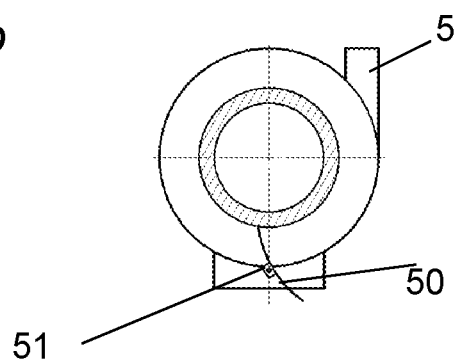
Figure 9C:
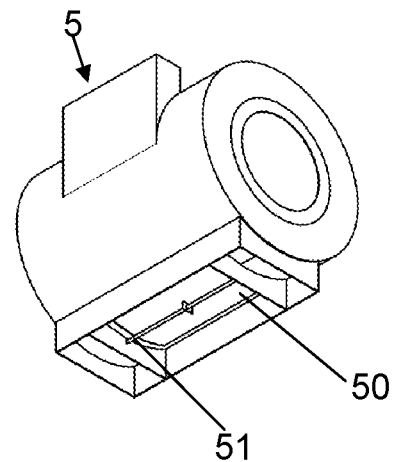

FIGS. 9a to 9c show an embodiment variant essentially corresponding to the example of FIG. 1a, with two differences, which will be addressed briefly herein. On the one hand, the fluid inlet 5 is arranged tangentially at the side and not at the top side of the separation chamber 3. On the other hand, a cleaning valve 50 is provided, which is attached to the separation chamber. The cleaning valve 50 is integrated into the cylindrical casing of the separation chamber and articulated to the separation chamber. In the closed position (FIG. 9c), the cleaning valve 50 is part of the separation chamber, whereas, when it is tilted up, it projects partially into the interior of the separation chamber and partially toward the outside (FIGS. 9a and 9b). A pivot mechanism 51 is provided, which is attached to the cleaning valve 50 roughly centrally. In an upwardly tilted position, the pivotable cleaning valve 50 can loosen the filter cake built up on the rotatable filter element 20 by mechanical strain, thereby regenerating the filter element 20. To increase the efficiency of the filter regeneration, brushes/knobs 41 may additionally be connected firmly to the cleaning valve 50.

The invention claimed is:

1. A separation device for particles from a fluid flow, comprising a centrifugal separator, wherein the centrifugal separator comprises:
   a separation chamber;
   a fluid inlet;
   at least two dip tubes; and
   at least one particle discharge opening,
   wherein the separation chamber is formed substantially as a rotational body,
   wherein the rotational body includes a casing and two end faces,
   wherein the fluid inlet leads into said separation chamber tangentially to the surface of said casing, wherein one dip tube is situated in one of the end faces and another dip tube is situated in the other end face, and wherein the particle discharge opening is arranged radially to a generated surface of the rotational body.

2. A separation device according to claim 1, wherein the rotational body is a right circular cylinder.

3. A separation device according to claim 1, wherein the dip tubes are arranged either along the axis of rotation of the rotational body or are arranged eccentrically to the axis of rotation of the rotational body.

4. A separation device according to claim 1, wherein the dip tubes are connectable or connected via a filter element in the separation chamber.

5. A separation device according to claim 4, wherein the filter element is placed on the inside or on the outside of the dip tube casing.

6. A separation device according to claim 4, wherein the filter element is a cartridge filter.

7. A separation device according to claim 4, further comprising a device for removing the filter cake from the filter element.

8. A separation device according to claim 7, wherein the device for removing the filter cake comprises an air compressor or a compressed air reservoir arranged after the dip tubes.

9. A separation device according to claim 7, wherein the device for removing the filter cake comprises a stationary or rotatable projection, which is arranged in the separation chamber or outside thereof, wherein the dip tubes are pivoted or firmly attached along the axis of rotation.

10. A separation device according to claim 9, wherein said projection comprises a brush.

11. A separation device according to claim 1, wherein the dip tubes are configured in a conical or trumpet shape.

12. A separation device according to claim 1, wherein the dip tubes have a circular cross-section.

13. A separation device according to claim 1, further comprising at least two particle discharge openings along the casing.

14. A separation device according to claim 1, wherein the dip tubes open into a container.

15. A separation device according to claim 14, wherein said container surrounds the centrifugal separator partially or completely.

16. A separation device according to claim 1, wherein the at least one particle discharge opening opens into a collection container connected to the separation chamber in a fluid-tight manner.

17. A separation device according to claim 1, further comprising a cleaning valve.

18. A separation device according to claim 17, wherein said cleaning valve is attached to the separation chamber.

19. A separation device for particles from a fluid flow, comprising a centrifugal separator, wherein the centrifugal separator comprises:
a separation chamber;
a fluid inlet;
at least two dip tubes connectable or connected via a filter element in the separation chamber; and
at least one particle discharge opening
wherein the separation chamber is formed substantially as a rotational body,
wherein the rotational body includes a casing and two end faces,
wherein the fluid inlet leads into said separation chamber tangentially to the surface of said casing; and
wherein one dip tube is situated in one of the end faces and another dip tube is situated in the other end face.

20. A separation device for particles from a fluid flow, comprising a centrifugal separator, wherein the centrifugal separator comprises:
a separation chamber;
a fluid inlet;
at least two dip tubes;
at least one particle discharge opening; and
a cleaning valve,
wherein the separation chamber is formed substantially as a rotational body,
wherein the rotational body includes a casing and two end faces,
wherein the fluid inlet leads into said separation chamber tangentially to the surface of said casing,
wherein one dip tube is situated in one of the end faces and another dip tube is situated in the other end face.

* * * * *